United States Patent [19]

Seng

[11] Patent Number: 4,565,562
[45] Date of Patent: Jan. 21, 1986

[54] TWO-STAGE HEATING MEDIA FEEDER FOR A GLASS BATCH PREHEATING DRUM

[75] Inventor: Stephen Seng, Bladensburg, Ohio

[73] Assignee: Owens-Corning Fiberglas Corporation, Toledo, Ohio

[21] Appl. No.: 685,431

[22] Filed: Dec. 24, 1984

[51] Int. Cl.$^4$ .............................................. C03B 3/00
[52] U.S. Cl. ........................................ 65/335; 65/27; 65/134; 165/88
[58] Field of Search ............... 65/27, 134, 335; 165/1, 165/88

[56] References Cited

U.S. PATENT DOCUMENTS 4,293,324 10/1981 Saeman .................................... 65/27
4,319,903 3/1982 Hohman et al. ......................... 65/27
4,338,113 7/1982 Hohman et al. ......................... 65/27
4,441,906 4/1984 Propster et al. ........................ 65/27

Primary Examiner—Robert Lindsay
Attorney, Agent, or Firm—Ronald C. Hudgens; Greg Dziegielewski; Paul J. Rose

[57] ABSTRACT

The heating media feeder includes a hollow conical frustum facing an inlet in the drum end plate, an aperture in the periphery of the conical frustum, a baffle outside the conical frustum aligned with a leading edge of the aperture therein, a circular plate adjacent a smaller end of the conical frustum, an aperture in the circular plate forwardly offset from that in the conical frustum, and a generally V-shaped chute on an opposite side of the circular plate aligned with the aperture therein.

4 Claims, 8 Drawing Figures

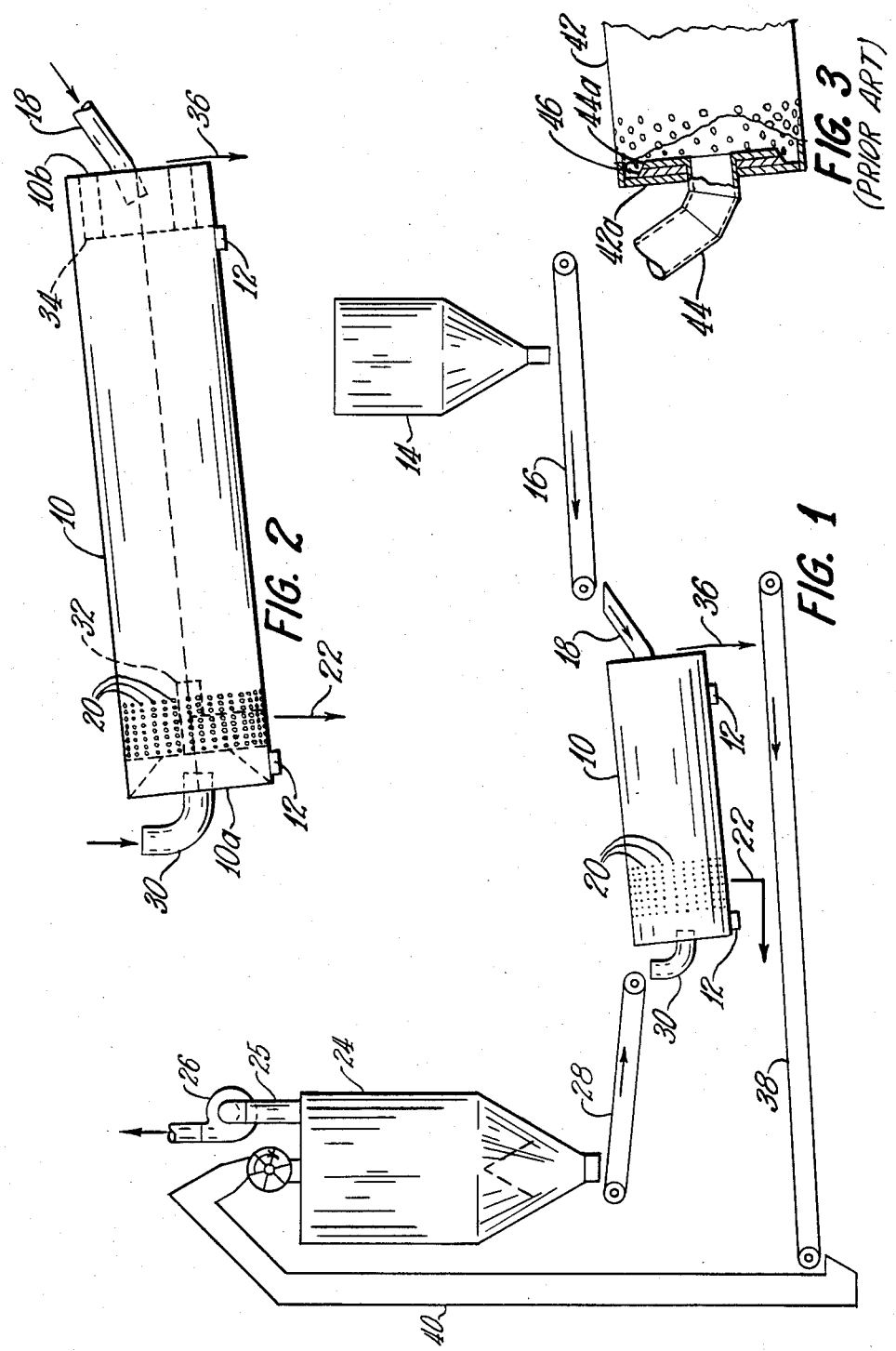

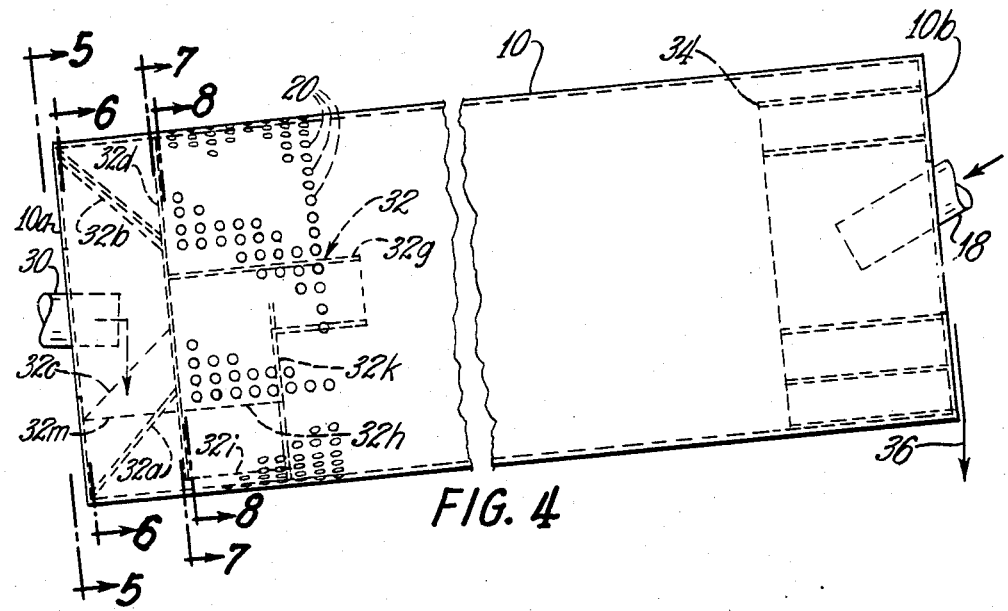
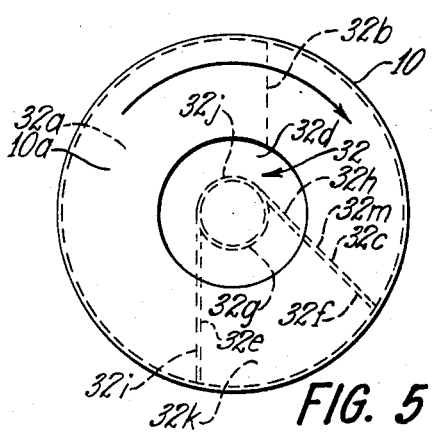
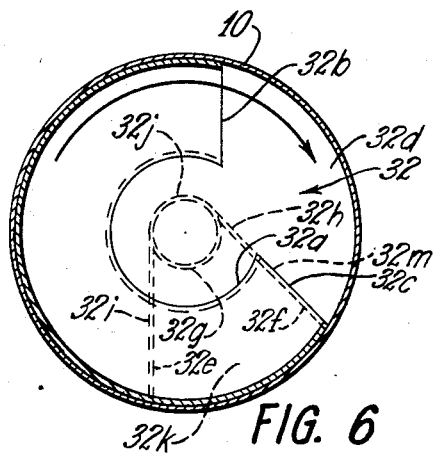
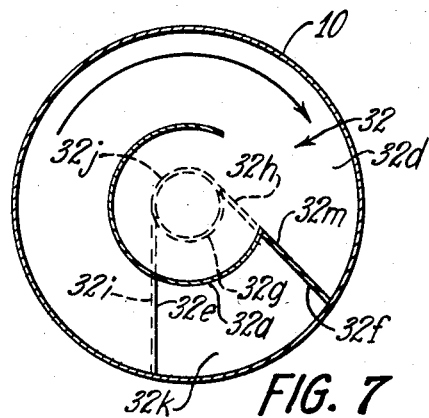
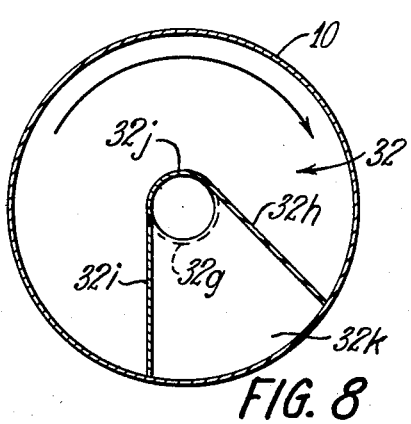

TWO-STAGE HEATING MEDIA FEEDER FOR A GLASS BATCH PREHEATING DRUM

TECHNICAL FIELD

This invention relates generally to apparatus for preheating glass batch material before feeding it to a melting furnace, and more particularly to a two-stage heating media feeder for a glass batch material preheating drum.

BACKGROUND ART

U.S. Pat. No. 4,319,903 discloses apparatus for preheating glass batch material before it is fed to a glass batch melting furnace. Heating media heated by exhaust gases from the furnace are fed one way through a rotating drum and glass batch material is fed the opposite way. The purpose of the preheating apparatus is to essentially double the rate at which molten glass can be withdrawn from the furnace. At the inlet end of the drum for the heating media, an inlet conduit passes through a central opening in an end plate of the drum and is provided with a stationary sealing flange inside the drum, the sealing flange holding a wear plate in contact with the inner side of the rotating end plate of the drum. Glass batch material works its way between the wear plate and the drum end plate. At temperatures higher than about 1000° F., this trapped glass batch material partially fuses and tends to bind the wear plate and end plate together, necessitating shutdown of the drum, temporary bypassing of the preheater, upsetting of the equilibrium of the furnace from the feeding of cold batch material thereto, and reducing the rate at which molten glass can be withdrawn from the furnace. The same harmful results occur when the wear plate needs replacement.

DISCLOSURE OF THE INVENTION

In accordance with the invention, a two-stage heating media feeder has been provided and fixedly secured inside the drum for rotation therewith. The former wear problems with a stationary sealing flange in engagement with a rotating drum end plate have been eliminated, along with the temperature limitation of about 1000° F. Preheating of the glass batch can now be carried out to a temperature of about 1800° F.

BRIEF DESCRIPTION OF DRAWINGS

The invention will be more fully understood when the following description is considered along with the accompanying drawings in which:

FIG. 1 is a schematic elevational view of a glass batch material preheating system including an inclined rotating drum having a two-stage heating media feeder constructed in accordance with the invention secured therein adjacent a lower end thereof;

FIG. 2 is an enlarged elevational view of the drum of FIG. 1;

FIG. 3 is fragmentary view, partially in section, of the prior construction of a glass batch material preheating drum, showing details adjacent the heating media inlet end of the drum;

FIG. 4 is fragmentary view representing a further enlargement of the drum of FIG. 2;

FIG. 5 is an end view of the drum of FIG. 4 taken in the direction of arrows 5—5;

FIG. 6 is a sectional view taken along the line 6—6 of FIG. 4;

FIG. 7 is a sectional view taken along the line 7—7 of FIG. 4; and

FIG. 8 is a sectional view taken along the line 8—8 of FIG. 4.

BEST MODE OF CARRYING OUT THE INVENTION

With reference to the drawings, FIG. 1 shows a glass batch material preheating drum 10 constructed in accordance with the invention and rotatably supported in an inclined position by bearings 12. Glass batch material is fed from a hopper 14 to a conveyor 16 and through an inlet conduit 18 extending through an upper portion of an aperture in a drum end plate 10b into the drum 10. After being heated, the glass batch material flows out of the drum 10 through side orifices 20 and is carried to a glass batch melting furnace (not shown) by a conveyor indicated only by an arrow 22.

The heating media for the glass batch material in the drum 10 may be glass batch agglomerates, in the form of balls, discs, briquettes, or pellets, or glass, ceramic, steel, or aluminum in various forms. Preferably, the heating media are ceramic balls about one inch in outer diameter. The heating media pass downwardly through a heat exchanging hopper 24 while hot exhaust gas from the glass batch melting furnace (not shown) passes upwardly therethrough and out a pipe 25 to a fan 26 which forces it to an exhaust stack (not shown). From the hopper 24 the heating media pass to a conveyor 28 and through an inlet conduit 30 extending through an aperture in a drum end plate 10a to a heating media feeder 32 (FIGS. 2 and 4) constructed in accordance with the invention, disposed in the drum 10, and more fully described hereinafter.

After the heating media pass through the glass batch material in the preheating drum 10, a scroll 34 (FIGS. 2 and 4) at the other end of the drum 10 from the feeder 32 aids in discharging them through a lower portion of the aperture in the drum end plate 10b, whereupon they fall as indicated by arrow 36 to a conveyor 38. From the conveyor 38, the heating media pass to an elevator 40 which deposits them back in the heat exchanging hopper 24.

FIG. 3 fragmentarily shows a glass batch material preheating drum 42 of the prior art. A heating media inlet conduit 44 passes through an aperture in an end plate 42a of the drum and is provided with a composite sealing flange including a flange 44a integral with the conduit 44 and a wear plate 46 bolted to the flange 44a by bolts (not shown). The wear plate is preferably mild steel, the flange 44a and the drum end plate 42a preferably being stainless steel. As noted heretofore, at temperatures above about 1000° F., the end plate 42a tends to bind together with the stationary wear plate, and the wear plate also wears away eventually regardless of temperature and has to be replaced. The glass batch material preheating drum 42 then has to be shut down while repairs are made, being bypassed during this time by feeding of cold glass batch material to the furnace. This disturbs the temperature equilibrium of the furnace and reduces the rate of molten glass withdrawal.

The heating media feeder 32 is shown more clearly in FIGS. 4–8 and includes a hollow frustoconical portion 32a cut away at a peripheral portion to provide an opening defined by a trailing edge 32b and a leading edge 32c, a circular plate 32d cut away between a leading edge 32e and a trailing edge 32f and between the frustoconical portion 32a and the drum 10, a cylindrical discharge nozzle 32g, and a generally V-shaped chute for feeding heating media to the nozzle and comprising a pair of generally radially extending rectangular straight wall portions 32h and 32i connected by a curved wall portion 32j, a generally arcuate plate member 32k extending generally arcuately between the wall portions 32h and 32i and generally radially between the nozzle 32g and the drum 10, and a triangular wall portion or baffle 32m which is aligned with the wall portion 32h and extends between the plate 32d and the frustoconical portion 32a. The curved wall portion 32j is aligned with a corresponding portion of the nozzle 32g.

The heating media, preferably ceramic balls, are fed from the inlet conduit 30 into the drum 10, and more specifically into the frustoconical portion 32a of the feeder 32. During each revolution of the drum 10, as the opening defined by the edges 32b and 32c traverses the lower portion of the drum 10, the heating media drop through that opening to the outside of the frustoconical portion 32a, where initially they are confined between the drum end plate 10a and the circular plate 32d. The triangular wall portion 32m and the rectangular wall portion 32h are aligned with the edge 32c. During the next revolution, the triangular wall portion 32m engages the heating media outside the frustoconical portion 32a and moves them arcuately along the inside of the drum 10. As the triangular wall portion 32m enters the upper portion of its path, the heating media drop down the outside of the frustoconical portion 32a, through the opening in the circular plate 32d defined by the edges 32e and 32f, into the chute defined by the straight wall portions 32h and 32i, the curved wall portion 32j, and the plate member 32k, and out the nozzle 32g into the portion of the drum 10 where they mix with and transfer heat to the glass batch material.

The heating media feeder 32 is secured to the inner periphery of the drum 10 in any suitable manner for rotation therewith. Preferably, it is made of stainless steel. The hollow frustoconical portion 32a open at its larger end and having the peripheral opening defined by the edges 32b and 32c may be said to form first stage means of the two-stage feeder, while the triangular baffle 32m, the nozzle 32g, and the generally V-shaped chute including the straight walls 32h and 32i, the curved wall 32j, and the plate 32k may be said to form second stage means. The circular plate 32d separates the two stages except when the peripheral opening therein defined by the edges 32e and 32f is at the bottom of the drum 10.

Various modifications may be made in the structure shown and described without departing from the scope of the invention.

I claim:

1. A rotatable glass batch material preheating drum having a two-stage heating media feeder secured therein adjacent an apertured end plate thereof, the heating media feeder comprising a hollow frustoconical portion having a larger open end disposed adjacent said drum end plate, a circular plate disposed adjacent a smaller end of the frustoconical portion and having a diameter substantially equal to the inner diameter of said drum, the frustoconical portion being cut-away at a peripheral portion thereof to provide an opening defined by a leading edge and a trailing edge whereby once each revolution thereof heating media received therein through the aperture in said drum end plate drop through the opening to a lower inner periphery of said drum between said drum end plate and said circular plate of the feeder, a generally triangular flat wall portion aligned axially of the drum with said leading edge defining the opening in the frustoconical portion and joined along three sides thereof respectively to the frustoconical portion, the circular plate, and the drum, the circular plate being cut-away at a peripheral portion between the smaller end of the frustoconical portion and the drum to provide an opening defined by a leading edge and a trailing edge and the trailing edge defining the opening in the circular plate being aligned axially of the drum with the leading edge defining the opening in the frustoconical portion whereby during the next revolution the triangular wall portion engages the heating media at the lower periphery of the drum between the drum end plate and the circular plate of the feeder and carries them toward an upper portion of the drum wherefrom any that haven't already passed through the opening in the circular plate progress along the outer surface of the frustoconical portion and pass through the opening in the circular plate, a generally V-shaped chute for receiving the heating media from the opening in the circular plate, the chute including a pair of generally radially extending rectangular straight wall portions disposed at an acute angle with respect to each other, having outer end portions aligned with the edges defining the opening in the circular plate, and connected adjacent inner ends by a curved wall portion, the chute also including a generally arcuate plate spaced from and joined to the circular plate by the pair of straight wall portions, the arcuate plate extending between the straight wall portions, and a cylindrical nozzle having a portion aligned with the curved wall portion of the chute and adapted to carry the heating media from the chute to the inside of the drum.

2. A rotatable glass batch material preheating drum having a two-stage heating media feeder secured therein adjacent an apertured end plate thereof, the heating media feeder comprising first stage feeding means adapted to receive heating media entering the drum through the apertured end plate and once each revolution to deposit the heating media at a lower portion of the drum in an otherwise vacant portion thereof, second stage feeding means adapted to transport the heating media at the lower portion of the drum to an upper portion of the drum and to discharge them into a heat-exchange portion of the drum containing glass batch material, and a circular plate separating the first stage feeding means from the second stage feeding means except at a peripheral opening therein aligned with the second stage feeding means and allowing transfer of heating media therethrough as the opening moves from the lower to the upper portion of the drum.

3. A rotatable glass batch material preheating drum having a two-stage heating media feeder secured therein adjacent an apertured end plate thereof, the heating media feeder comprising a hollow frustoconical portion having a larger open end disposed adjacent said drum end plate and having a peripheral opening, a circular plate disposed against a smaller end of the frustoconical portion, having a diameter substantially equal to an inner diameter of the drum, and having a peripheral opening in a portion thereof between the smaller end of the frustoconical portion and an inner surface of the drum, the opening in the frustoconical portion and the opening in the circular plate being arcuately offset from each other with a trailing edge of the opening in the circular plate being aligned with a leading edge of the opening in the frustoconical portion, a baffle extending between the outside of the frustoconical portion and the circular plate and being aligned with said aligned edges of the openings therein, a generally V-shaped wall structure disposed against the circular plate on the opposite side thereof from the frustoconical portion and including an open-ended curved wall portion concentric with axes of the drum, the circular plate, and the frustoconical portion and a pair of straight wall portions disposed at an acute angle with respect to each other and extending respectively from opposite ends of the curved wall portion to the inner surface of the drum, outer end portions of the straight wall portions being aligned respectively with a leading edge of the opening in the circular plate and said trailing edge of the opening in the circular plate, and a generally arcuate plate spaced from the circular plate by said straight wall portions, extending between said straight wall portions, and extending from the inner surface of the drum to an inner edge defining a circular opening with said curved wall portion.

4. A preheating drum as claimed in claim 3 wherein a cylindrical nozzle is disposed on the opposite side of said generally arcuate plate from the generally V-shaped wall structure and concentrically of said circular opening.

* * * * *